United States Patent [19]

Sherman

[11] 3,972,302

[45] Aug. 3, 1976

[54] VELOCIPEDE PRESENCE INDICATING DEVICE

[75] Inventor: Alan E. Sherman, Overland, Mo.

[73] Assignee: Steven Manufacturing Company, Hermann, Mo.

[22] Filed: Apr. 4, 1975

[21] Appl. No.: 565,064

[52] U.S. Cl............................ 116/28 R; 280/289 A; 350/98; 224/39
[51] Int. Cl.²................... B60Q 11/00; G09F 17/00
[58] Field of Search........................ 116/28 R, 173; 224/39 R; 135/7; 248/40, 42, 43; 280/289; 40/129 C; 24/73 B, 73 AS, 81 CC; 350/97, 98

[56] References Cited
UNITED STATES PATENTS

| | | | |
|---|---|---|---|
| 1,282,511 | 10/1918 | Williams et al.................... | 24/81 CC |
| 1,413,530 | 4/1922 | Harned............................. | 224/39 R |
| 1,912,704 | 6/1933 | Graham............................ | 248/40 X |
| 2,753,439 | 7/1956 | Greenfield........................ | 116/28 R |
| 2,927,310 | 3/1960 | Knapp.............................. | 116/28 R X |
| 3,169,739 | 2/1965 | Yacobian.......................... | 116/173 X |
| 3,237,899 | 3/1966 | Lewis............................... | 224/39 R |
| 3,256,034 | 6/1966 | Condray........................... | 248/40 X |
| 3,540,406 | 11/1970 | Dexter............................. | 116/173 X |
| 3,788,268 | 1/1974 | Hiatt et al........................ | 116/28 R |
| 3,877,112 | 4/1975 | Pesta............................... | 24/73 B |

*Primary Examiner*—Richard C. Queisser
*Assistant Examiner*—Daniel M. Yasich
*Attorney, Agent, or Firm*—Polster and Polster

[57] ABSTRACT

A device for indicating the presence and distance required to clear a velocipede is provided which is attached easily to the velocipede, for example, a bicycle, on a frame member or a luggage carrier, the luggage carrier being mounted to a suitable structural member of the bicycle. The device includes indicating means and means for providing a storage position for the indicating means. The indicating means may be displayed on either or both sides of the bicycle. The indicating means is designed to be spring mounted to a support member attached to the bicycle frame, or to the end of a standard bicycle luggage carrier on bicycles so equipped.

7 Claims, 11 Drawing Figures

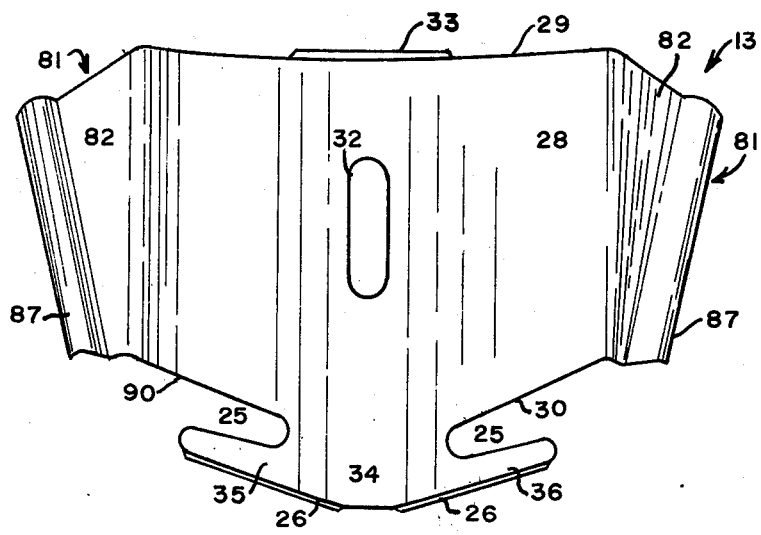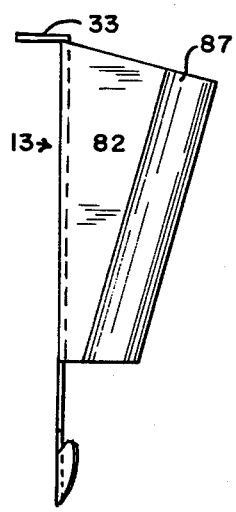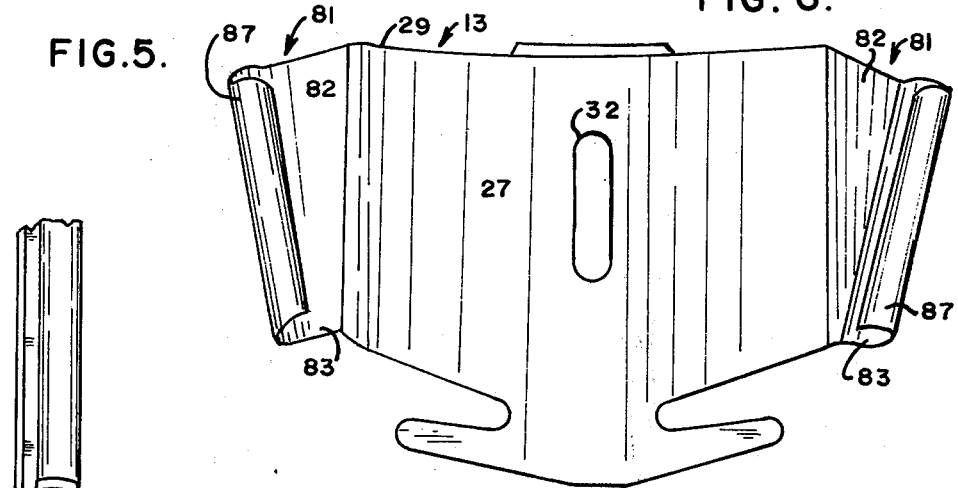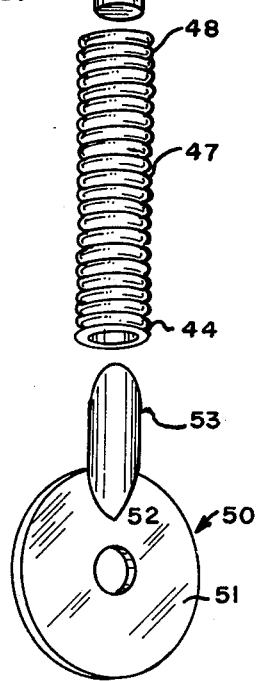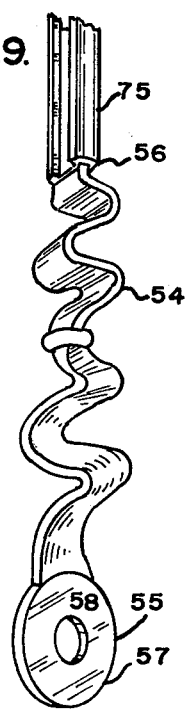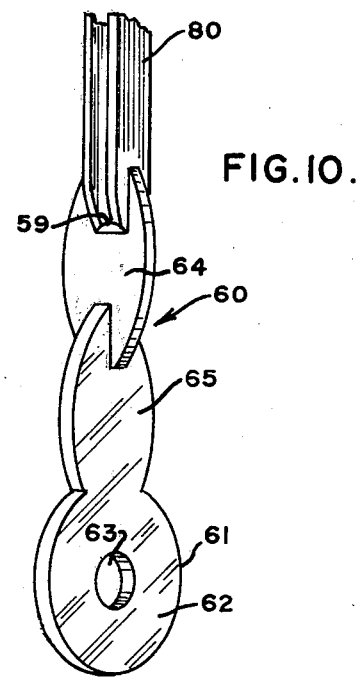

VELOCIPEDE PRESENCE INDICATING DEVICE

BACKGROUND OF THE INVENTION

This invention relates to a safety device, and in particular to a device for indicating the presence and distance required to clear a velocipede safely. While the invention is described with particular emphasis with respect to its use in conjunction with a two wheel bicycle, those skilled in the art will recognize the wider applicability of the invention disclosed hereinafter.

Various means for indicating the presence of a bicycle or other velocipede or vehicle forms are known in the art. For example, one popular apparatus is a device having a vertically extending pole with a plastic flag indicator mounted to its upper end. The height of the device makes it particularly useful for indicating the presence of a bicycle rider in vehicular traffic. While these prior art devices work well for their intended purposes, they have been deficient in performing safety functions under certain conditions. For example, when a bicycle and rider are approached from the rear at dusk or in darkness, it often is difficult to gage the distance required to clear the bicycle and rider with any degree of accuracy. Bicycle accidents also often occur when bicycle riders are riding together in groups as is popularly done. In these circumstances, bicycle riders often collide with one another, again apparently because of an inability to gage proper distances between riders. Prior art indicating devices do not function well for these purposes. Known devices generally also have not been adaptable to storage, and consequently, always are displayed.

The invention disclosed hereinafter functions to display in a visual manner the distance required to clear a bicycle rider. In addition, it is designed to provide an unobtrusive storage position for the indicating device when display either is not desired or not required. In its extended position, the indicating device of this invention is flexibly mounted to the bicycle so that it moves readily when even light forces are applied to it, so as not to exert abnormal loads on the bicycle and rider.

One of the objects of this invention is to provide a low cost safety device for velocipedes.

Another object of this invention is to provide a device for indicating the distance required to clear a velocipede or other vehicle.

Another object of this invention is to provide an indicating device which may be stored unobtrusively when not in use.

Another object of this invention is to provide an indicating device for a bicycle or the like which also may be used as a projecting load indicator for the projecting load created when one or more bicycles are placed on a conventional automobile bicycle carrying rack.

Yet another object of this invention is to provide an indicating device which, as another function, may carry specific indicia, as for example, advertising messages or symbols.

Other objects of this invention will be apparent to those skilled in the art in light of the following description and accompanying drawings.

SUMMARY OF THE INVENTION

In accordance with this invention, generally stated, a device for indicating the presence and the distance required to clear a velocipede, preferably a bicycle, includes a bracket removably mounted to a frame member of the bicycle, or to a luggage rack attached to the bicycle structure. A spring means is attached to the bracket so that an end of the spring means is directed outwardly from each side of the bicycle frame member. The ends of the spring means are adapted to receive respective ends of a pair of flag rods. Means are provided for storing each of the rods against the bicycle structure when the indicating device is not in service.

BRIEF DESCRIPTION OF THE DRAWINGS

In the drawings:

FIG. 3b is a view in side elevation of the clasp means shown in FIG. 3a;

FIG. 5 is a plan view of a back side of the bracket utilized in conjunction with the indicating device of FIGS. 1 and 4;

FIG. 6 is a view in side elevation of the bracket shown in FIG. 5;

FIG. 7 is a plan view of a front side of the bracket utilized in conjunction with the indicating device of FIGS. 1 and 4;

FIG. 8 is a second illustrative embodiment of structure for spring mounting a flag rod to a bracket;

FIG. 9 is a third illustrative embodiment of structure for spring mounting a flag rod to a bracket; and FIG. 10 is a fourth illustrative embodiment of structure for spring mounting a flag rod to a bracket.

DESCRIPTION OF THE PREFERRED EMBODIMENT

Figure 1:
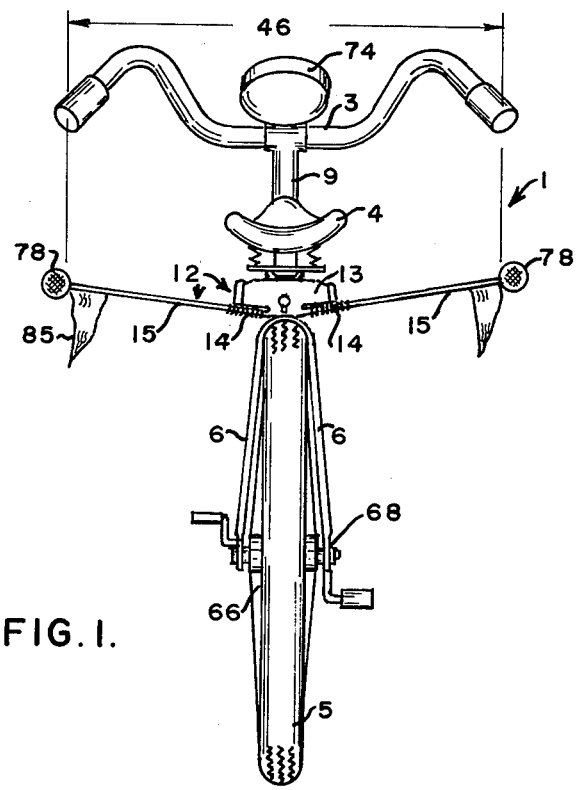
FIG. 1 is a view in end elevation of a bicycle having one illustrative embodiment of indicating device of this invention mounted to it.
Figure 2:
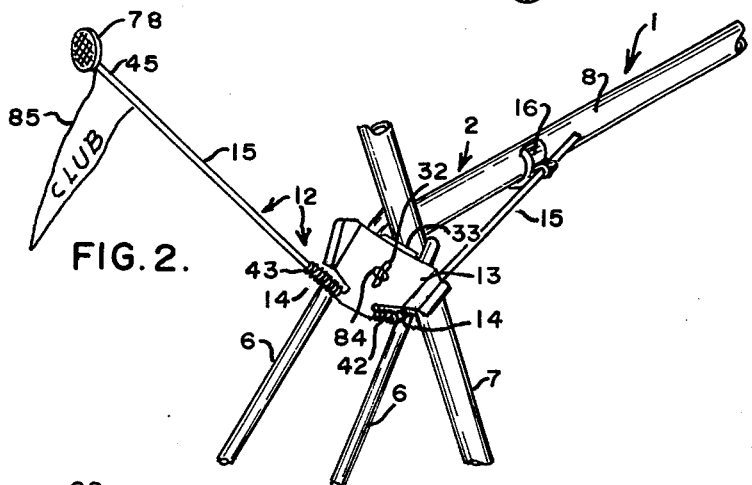
FIG. 2 is a view in perspective, partly broken away, illustrating the extended and stored position of the indicating device of this invention.
Figure 4:
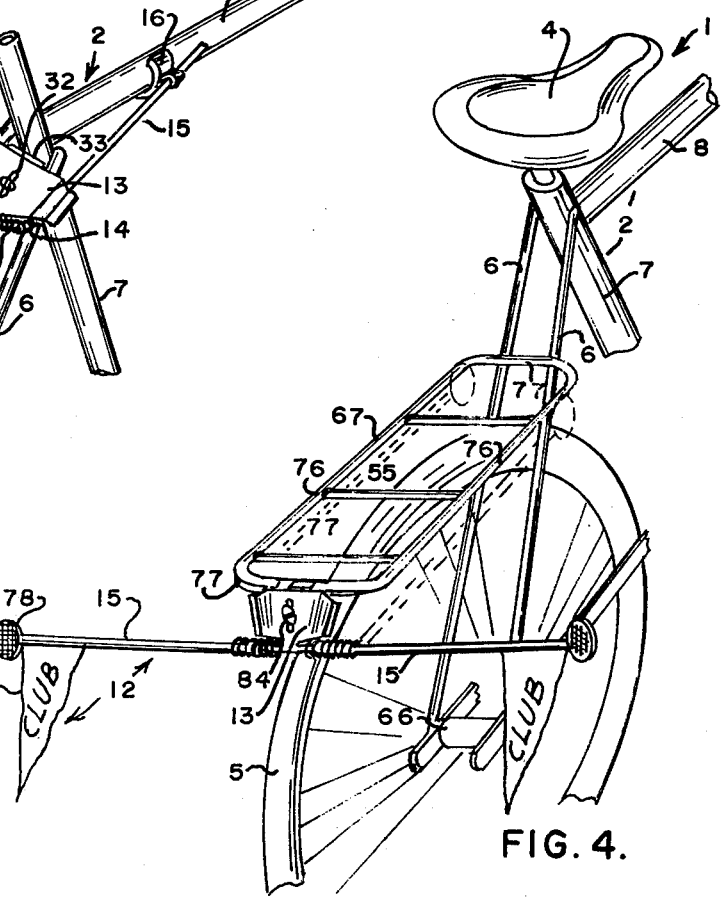
FIG. 4 is a view in perspective, partly broken away, showing a second mounting position for indicating device of this invention.

Referring now to FIGS. 1, 2, and 4, reference numeral 1 indicates a conventional bicycle which commonly includes a frame 2, a handlebar 3, a saddle 4, and front and rear wheels 5. For drawing simplicity, only the rear one of the wheels 5 is shown. As illustrated, the rear wheel 5 is mounted to the frame 2 along a pair of seat stays 6. The frame 2 conventionally includes a seat tube 7 and a top tube 8 which extends between the seat tube 7 and a forward vertical member 9, observable in FIG. 1. A down tube, not shown, extends between the member 9 and a pedal fitting 68. The intersection point of the tubes 7 and 8 may vary in bicycles with which the invention disclosed hereinafter has application. For example, it is conventional to manufacture different models known in the trade as ladies bicycles and mens bicycles, the main difference between them being the position of the intersection point of the tubes 7 and 8. The bicycle 1 may be provided with a head lamp 74, if desired.

Each of the seat stays 6 has a first end attached to the seat tube 7, and a free end adapted to receive an axle 66 of the wheel 5. An indicating device 12 is mounted to the bicycle 1 at any convenient location. For example, the device 12 may be attached to the bicycle 1 at or near the top of the seat stays 6, as shown in FIGS. 1 and 2, or it may be attached to the back end of a luggage rack 67, as shown in FIG. 4, when the bicycle 1 is so equipped.

The rack 67 is conventional and generally includes a pair of outer parallel frame members 76 having a plurality of cross members 77 extending between them. The outboard-most one of the cross members 77 either may be integrally formed with the frame member 76, giving the rack 67 its indicated appearance, or they may be manufactured separately. In the latter case, the rack 67 may have an appearance differing from that illustratively shown in the drawings. The rack 67 usually is supported by a stand, not shown, attached between the axle 66 of the wheel 5 and the rack 67.

The device 12 includes a bracket 13, a pair of springs 14, a pair of flag rods 15, reflector means 78, and a clasp means 16. The clasp means 16 is attached to the top tube 8 or seat tube 3 of the frame 2, or to the frame members 76 of the rack 67. The clasp means 16 preferably includes a body 17 having a C-shape in plan. Body 17 has a first arm 18, a second arm 19, a bridge portion 70, and an open mouth 20. The body 17 is arranged so that it defines an axial channel 24 which is open along the mouth 20. A pair of clips 21 and 22, respectively, have an open mouth 79, and are attached to the body 17. The clips 21 and 22 define a receiver 23 which is sized to accept the rods 15 with flags 44 furled, as later described in greater detail. The clasp means 16 preferably is constructed from a flexible material. Plastic works well, for example. The flexibility of the material and the open mouth 20 permit the clasp 16 to be snapped over the top tube 8 or the frame members 76. Those skilled in the art will recognize that the dimensions of the mouth 20 and the channel 24 may vary, depending upon the point of application for the clasp means 16. The channel 24 is sized so that the clasp 16 is free to slide along the top tube 8 or other point of attachment to the frame 2 in a slip fit. The reflector means 78 is conventional and is not described in detail. A number of reflector devices are available commercially, and the means 78 is attached to the flag rods 15 by any convenient method.

Bracket 13, shown in particular detail in FIGS. 5 and 6, is an elongated member 90 having a front face 27 and a back face 28 which terminate along an upper edge 29 and a lower edge 30. The bracket 13 has an opening 32 through it, between the faces 27 and 28. Each end of the member 90 has a keeper 81 formed in it. Keeper 81 includes a central wall 82 projecting outwardly from the plane of the face 27, and an inwardly curved lip 87. The lip 87 defines an open mouth channel 83 which receives the rod 15 for purposes described in detail hereinafter.

The edge 29 has a flange 33 formed along it. The flange 33 extends outwardly from the face 28 side of the bracket 13. The flange 33 is important in the use of the indicating device 12. When the bracket 13 is mounted against the seat stays 6, as shown in FIG. 2, then the flange 33 fits between the stays 6 and abuts respective ones of the stays 6 along an outboard edge of the flange. That abutment prevents rotation of the bracket 13 should a fastener 84 loosen after the bracket 13 is attached to the bicycle 1. When the bracket 13 is mounted to the rack 67, as shown in FIG. 4, then the flange 33 rests atop the outboard cross member 77, and again prevents rotation of the bracket 13, should the fastener 84 become loose for any reason.

Bracket 13 preferably is constructed from sheet metal, and the lower edge 30 has a central tab 34, and a pair of arms 35 and 36, respectively, formed in it during manufacture. The arms 35 and 36 define a slot 25 with the edge 30, and the lower edge of the arms 35 and 36, referenced to FIGS. 5 through 7, have a ridge 26 projecting outwardly from the plane of each of the arms 35 and 36.

In the preferred embodiment, the springs 14 are conventional coil expansion springs having a first end 42 and a second end 43. The diameter of the springs 14 is chosen so that each of the springs 14 may be placed over the arms 35 and 36. The ridge 26 size and spring 14 diameter are chosen so that the ridge and arms 35 and 36 combination engage the springs 14 in a tight, friction fit, so that the springs 14 do not work loose during use. The free end of the springs 14 receives an end of the flag rod 15 in a press fit.

Use of the indicating device 12 of this invention is simple. The bracket 13 is positioned on any convenient location along the frame 2, preferably at the locations described above. When mounting the bracket 13 along the seat stays 6, use of a backer plate, not shown, is desirable in order to secure the stays 6 between the bracket 13 and the backer plate. The backer plate need be nothing more than a rectangular strip having an opening in it, aligned with the opening 32. Opening 32 is sized to receive a variety of conventional threaded fasteners, the fastener 84 merely being exemplary of the many types available. Either before or after attachment of the bracket 13, the springs 14 are inserted over the arms 35 and 36. As indicated above, the frictional engagement of the springs 14 and the arms generally is sufficient to hold the springs to the bracket 13. The rods 15 thereafter are inserted in the free ends of the springs 14. Insertion of the rods 15 in the springs 14 results in deployment of the rods 15 to the position shown in FIG. 1.

The rods 15 are conventional and preferably are constructed from a suitable plastic material. Various shapes may be utilized for the rods, and the rod ends inserted in the springs 14 may, and preferably do, have a reduced diameter portion to aid in that interconnection. Each of the rods 15 has an indicator flag 44 attached near a distal end 45 of the rods. Flag 44 may be fabric or plastic and may include reflective material in its composition to enhance the visibility of the device. For example, reflective material, available from the E. I. DuPont de Nemours & Company under the trademark "AFFLAIR," may be mixed with the material utilized for either or both of the rods 15 and flag 44 to give the device 12 high reflectivity during night or dusk hours. In addition, the flag 44 may have indicia indicated generally by the numeral 85, printed or otherwise exposed along the surface areas of the flags.

As previously described, clasp means 16 is inserted over the top tube 8. The resiliency of the material from which clasp means 16 is constructed permits its easy insertion over the tube 8. The receivers 23 are used to engage the flag rods 15 with the flags 44 furled, near the distal end 45 of the rods, which engagement defines a storage position for the indicating device 12. That position is best illustrated in FIG. 2. When nondeployment or storage of the indicating device 12 is desired, the user merely draws the end 45 of the rod 15 towards the top tube 8 and slides the clasp 16 along the tube 8 so as to engage the rod in the receiver 23. While the rods 15 may be inserted in the receivers 23 with the flags 44 unfurled, it will be appreciated that in their unfurled condition the flags may interfere with the rider or with the wheels 5. For that reason, the clasp means 16 is designed to accept the flag rods 15 with the flags furled in the storage position of the indicating device 12. Redeployment is gained merely by disengaging the clasp 16 and the rod 15 and unfurling the flags 44. In the mounting position shown in FIG. 4, the clasp means 16 may be carried by the frame members 76, and functions in the manner just described. However, pairs of clasp means 16 are required for the mounting position shown in FIG. 4, if clasp means 16 are used at all. As will be understood by those skilled in the art, luggage racks, of which the rack 67 is illustrative, often come or eventually are equipped with a spring loaded clamp (not shown), or with a rubber bungee (not shown) commonly used to attach various items to the luggage rack. When so equipped, the clasp means 16 may be eliminated and either the spring clip or rubber bungee used to hold the flag rods 15. The mounting position shown in FIG. 4 also permits the flag rods 15 to be interlocked with the structure of the luggage rack 67 by mere manipulation of the rods 15, although this is a less desirable method for storing the flag rods 15.

Figure 3A:
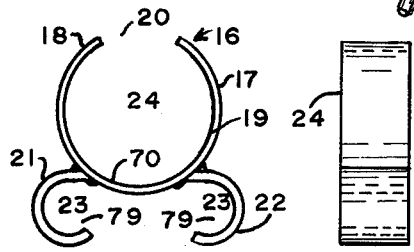
FIG. 3a is an end view of a clasp means utilized in conjunction with the indicating device of FIG. 2.
Figure 3B:
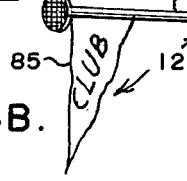

The particular construction of the clasp means 16 is important in its intended use. As indicated, the diameter of the channel 24 must be large enough to permit quick movement of the clasp 16 between positions. After reception of the flag rods 15 in the receivers 23, the springs 14, acting through the rods 15, will exert a force on the clips 21 and 22 tending to force the clips outwardly, referenced to FIG. 3a. Restated, a force is exerted on the clips 21 and 22 which would tend to force the clips outwardly, if they were not attached to the body 17 of the clip means 21. Because of the attachment, however, the force is transmitted to the arms 18 and 19 of the clip means 16, and tends to prevent the accidental movement of the clip means when the device 12 is in its storage position. The force exerted with even a single one of the flag rods 15 is sufficient for this purpose, and the storage position may be maintained for a single rod in either of the mounting positions illustrated in the drawings.

Spring mounting the rods 15 has a number of advantages. First, because of the spring mounting, damage to passing cars or stationary objects by the deployment of the rod 15 is minimized. Second, the chance of being thrown to the ground because an article strikes the rod 15 also is minimized. Third, the bicycle 1 may be mounted in a conventional manner. That is, mounting may be accomplished by swinging one foot over the saddle 4 from the rear of the bicycle 1, even with the device 12 in its deployed position. Fourth, the springs are used to exert a force for holding the clasp means in position when the indicating device is in its stored condition.

The length of the rods 15 may vary. I find it desirable to utilize a length for the rods 15 such that each of the rods 15 indicates a distance at least equal to one-half the width of the bicycle. The overall width of the bicycle 1 is indicated by the numeral 46 in FIG. 1. While the total length of the rods 15 and the springs 14 preferably is chosen so that they are at least equal to the width dimension of the bicycle 1, other lengths may be used, if desired.

Because two of the rods 15 are utilized, the user may deploy only a single flag. Even the use of a single flag, however, will give an indication of the distance required to clear the bicycle along the side having the flag 44 deployed. The driver of a vehicle approaching from the rear of the bicycle 1, by observing the relative position of the displayed flag 44 and the handlebar 3, will be able to judge the distance required to clear the bicycle with little difficulty.

The keeper 81 functions to provide an additional safety feature for the indicating device 12, in addition to those described above. As will be appreciated by cyclists and others skilled in the art, bicycles often are transported by automobiles or similar vehicles, the bicycles being attached to a suitable rack structure mounted on the rear of the vehicle. The bicycles, in their carried position, project outwardly from the carrier vehicle. The channel 83 of the bracket 13 permits the rods 15 to be inserted in it. In this position, the flag rods 15 assume an approximate vertical attitude, and the flags may be used to indicate the presence of the projecting load to other approaching drivers.

FIGS. 8 through 10 are illustrations of various other embodiments for spring loading the rod 15. In FIG. 8, a spring 47 has an end 48 and an end 49. The end 48 receives the end 45 of the rod 15 in a manner similar to that employed for the spring 14. As previously indicated, the end 45 of the rod 15 may have a reduced diameter which aids in the interconnection of the rod 15 along the end 48 of the spring 47, and the end 49 of the spring 47 receives a connector 50. Connector 50 comprises a plastic disc member 51 having a central opening 52 through it, which is utilized to attach the connector 50 either to a modified bracket 13 or directly to the bicycle 1. An arm 53 extends radially outwardly from the disc 51 and is sized so that the end 49 of the spring 47 may be placed over the outer diameter of the arm 53.

FIG. 9 illustrates an integral combination for a rod 75, a spring 54, and a connector 55. In this embodiment, the rod 75 may be similar to the rod 15 described in conjunction with the previous embodiments of my invention. However, the spring 54, which comprises a convoluted section of plastic material, is integrally formed between an end 56 of the rod 75, and the connector 55. Again, the connector 55 may comprise a disc 57 having a central opening 58 through it. The opening 58 enables the connector 55 to be mounted to the bicycle 1 at a variety of locations, or to the bracket 13, by any convenient method.

In FIG. 10, a rod 80 has an end 59 integrally formed with a spring means 60. A distal end of spring means 60 is integrally formed with a connector 61. Rod 80 may be similar to other flag rod embodiments disclosed, and is not described in detail. The connector 61, again, includes a disc 62 having a central opening 63 through it, for mounting the integral combination to the bicycle 1. Spring means 60, however, comprises at least a first ellipse 64 and a second ellipse 65. The ellipses 64 and 65 are rotated ninety degrees with respect to one another and interconnected chain link fashion to provide the desired flexibilities for the spring means 60. As indicated above, the connector 61 may be mounted either to the bracket 13 or to some other convenient location on the bicycle 1.

Although various embodiments for indicating device 12 have been described, those skilled in the art will recognize that the clasp means 16 is compatible with any of the embodiments shown. It also will be understood that certain features and subcombinations are of utility and may be employed without reference to other features and subcombinations. This is contemplated by and is intended to be within the scope of the claims.

Numerous variations, within the scope of the appended claims, will be apparent to those skilled in the art in light of the foregoing description and accompanying drawings. Thus, the design of the rod 15 may vary in other embodiments of this invention. The particular rod 15 shown generally is an X-shaped beam member in cross section. However, other designs or configurations are acceptable. Illustrative variations are set out in FIGS. 9 and 10. In like manner, while the spring means 60 was described as using ellipses linked chain fashion for a spring, other shapes may be linked in the same manner with similar results. Other springs or spring means configurations will occur to those skilled in the art. The design silhouette of the bracket 13 may be varied, particularly if the rod, spring, and connector designs of FIGS. 8-10 are used in combination with the bracket 13. In like manner, the bracket 13 may have a plurality of ridges formed in it, in order to provide structural rigidity for the bracket. Areas of such ridges for rigidity are a well known technique in metal fabrication. The depth of the channel 83 may be changed. Thus, various embodiments may use substantially different dimensions for the channel. Those skilled in the art also will realize that the luggage rack 67 usually comes equipped with a brace, not shown, for mounting a reflector to the rack. For the mounting position shown in FIG. 4, the bracket 13 may be mounted directly to the brace of the luggage rack 67, in place of the reflector normally carried in that location, or the reflector and its mounting hardware in lieu of the bracket 13 hardware described above, for attaching the bracket to the rack 67. The bracket 13 may be redesigned to accomodate a single spring having its ends extending outwardly from the edges of the bracket 13. This embodiment is more expensive to manufacture in that more involved metal forming techniques are required in the bracket construction. While particular materials were described as preferred for constructing various structural components of the indicating device 12, other materials may be used where desired or economically feasible. These variations are merely illustrative.

Having thus described the invention, what is claimed and desired to be secured by Letters Patent is:

1. A device for indicating the presence and distance required to clear a bicycle, said bicycle having a frame member and a handlebar mounted to said frame, comprising:

a bracket having a top edge, a bottom edge, a pair of side edges, a length dimension, and a width dimension, said bracket including means for mounting said bracket to said bicycle, said bracket including a flange extending outwardly from the top edge of said bracket, said bicycle further being characterized by a rear wheel, and a luggage rack, said luggage rack being mounted over the rear wheel of said bicycle, said bracket being mounted to said luggage rack so that said flange abuts the luggage rack, preventing rotation of said bracket;

spring means attached to said bracket, said spring means extending outwardly from said bracket;

a pair of flag and reflector rods having first and second ends, one each of said rods being mounted to said spring means along the first end of each of said rods so that said flag and reflector rods extend outwardly on oppositely opposed sides of said bicycle, said pair of flag and reflector rods being movable, along said spring means, between at least a first, extended position and a second, stored position; and means for attaching the second end of said flag rod to said bicycle, engagement of said flag rod and said attaching means defining the second, stored position for said flag rods, said attaching means including a clip means slidably mounted to said luggage rack, and means for receiving the free end of said flag rod.

2. A device for indicating the presence and distance required to clear a bicycle, said bicycle having a frame member and a handlebar mounted to said frame, comprising:

a bracket having a top edge, a bottom edge, a pair of side edges, a length dimension and a width dimension, said bracket including means for mounting said bracket to said bicycle, said bracket further including a flange extending outwardly from the top edge of said bracket, said bicycle frame including a pair of seat stays and a seat tube, said seat stays being attached to said seat tube along one end thereof, said bracket being mounted to said bicycle along said seat stays, said flange being adapted to abut said seat stays and prevent rotation of said bracket;

spring means attached to said bracket, said spring means extending outwardly from said bracket;

a pair of flag and reflector rods having first and second ends, one each of said rods being mounted to said spring means along the first end of each of said rods so that said flag and reflector rods extend outwardly on oppositely opposed sides of said bicycle in an extended position of said rods, said pair of flag and reflector rods being movable, along said spring means, between said extended position, and a second, stored position; and means for attaching the second end of said flag rod to said bicycle, said attaching means including clip means slidably mounted to said frame member of said bicycle, said clip means adapted to engage the free end of said flag rods, engagement of said flag rods and said attaching means defining the second, stored position for said flag rods.

3. A device for indicating the presence and distance required to clear a bicycle, said bicycle having a frame member and a handlebar mounted to said frame member, comprising:

a bracket having a top edge, a bottom edge, a pair of side edges, a length dimension and a width dimension, said bracket including means for mounting said bracket to said bicycle, said bracket including a pair of keeper means formed along said pair of side edges, said keeper means including a channel sized to receive said flag and reflector rods;

spring means attached to said bracket, said spring means extending outwardly from said bracket, said spring means comprising a pair of coil extension springs, said bracket having means for mounting an end of said springs to said bracket, said spring mounting means being formed along the bottom edge of said bracket;

a pair of flag and reflector rods having first and second ends, one of said rods being mounted to said spring means along the first end of each of said rods so that said flag and reflector rods extend outwardly on oppositely opposed sides of said bicycle to define an extended position for said rods, said pair of flags and reflector rods being movable, along said spring means, between at least said first extended position and a second stored position; and means for attaching the second end of said flag rod to said bicycle, said attaching means comprising clip means slidably mounted to said bicycle, said clip means adapted to engage the free end of said flag rods, engagement of said rods and said attaching means defining the stored position for said rods, said clip means including a body part having a channel formed in it, and a pair of clips, each of said clips defining a receiver, said receivers being sized to receive the ends of said flag rods, said spring means exerting a force on said body part through said flag rods upon the insertion of said rods in said receivers.

4. The device of claim 3 wherein said spring mounting means includes an arm formed along the bottom edge of said bracket, said arm having a ridge formed in it, said ridge adapted to permit said arm to receive said spring in a slip fit.

5. A device for indicating the presence and distance required to clear a bicycle, said bicycle having a structure including a frame member, and a handlebar mounted to said frame member, said handlebar and frame member having a width dimension, said frame member having a longitudinal axis, comprising:

a bracket having a top edge, a bottom edge, a pair of side edges, a length dimension, a width dimension, and a flange extending outwardly from the top edge of said bracket, said flange abutting the structure of said bicycle to prevent rotation of said bracket, and means for mounting said bracket to said bicycle;

a pair of springs attached to said bracket, individual ones of said spring pair extending outwardly from said bracket along said side edge pair;

a pair of indicating rods having first and second ends, one each of said rods being mounted to respective ones of said springs along the first ends of each of said rods so that said indicating rods extend outwardly on oppositely opposed sides of said bicycle to define an extended position for said indicating rods, said indicating rods having a combined length dimension as measured from the second end of each of said indicating rods in said extended position which approximately corresponds to the width of said bicycle, said springs permitting free movement of said rods and enabling said rods to be moved at least from said extended position to a storage position, the longitudinal length of said rods extending generally along the longitudinal axis of said bicycle in said storage position; and means for engaging the second end of said indicating rods in said storage position.

6. The device of claim 5 wherein said engaging means comprises a clip including a body part having an open mouth channel formed in it, said channel being sized to permit clip intermounting on said bicycle structure, and a pair of receivers integrally formed with said body part, said receivers being sized to permit insertion of the second end of said rods.

7. The device of claim 5 wherein said bicycle structure includes a luggage rack, said luggage rack constituting said engaging means.

* * * * *